(12) United States Patent
Kuwabara et al.

(10) Patent No.: US 7,767,241 B2
(45) Date of Patent: Aug. 3, 2010

(54) DRY FRACTIONATION METHOD FOR FAT

(75) Inventors: Yuji Kuwabara, Izumisano (JP); Nobuaki Kanai, Izumisano (JP); Toshiaki Takahashi, Izumisano (JP); Yoshihiro Yamanaka, Izumisano (JP); Koichi Kuramori, Izumisano (JP); Sachiko Inui, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 1221 days.

(21) Appl. No.: 10/529,550

(22) PCT Filed: Sep. 29, 2003

(86) PCT No.: PCT/JP03/12446

§ 371 (c)(1), (2), (4) Date: Mar. 29, 2005

(87) PCT Pub. No.: WO2004/029185

PCT Pub. Date: Apr. 8, 2004

(65) Prior Publication Data

US 2006/0165867 A1 Jul. 27, 2006

(30) Foreign Application Priority Data

Sep. 30, 2002 (JP) .............................. 2002-287928
Sep. 17, 2003 (JP) .............................. 2003-324787

(51) Int. Cl.
*C11D 7/00* (2006.01)

(52) U.S. Cl. .................. 426/417; 426/606; 554/211

(58) Field of Classification Search ................. 426/601, 426/606, 607, 417
See application file for complete search history.

(56) References Cited

U.S. PATENT DOCUMENTS 4,438,149 A * 3/1984 Verhagen et al. ............ 426/603

(Continued)

FOREIGN PATENT DOCUMENTS

EP 63389 10/1982

(Continued)

OTHER PUBLICATIONS

Hashimoto, S. 2001. JAOCS 78(5)445.*

(Continued)

*Primary Examiner*—Carolyn A Paden
(74) *Attorney, Agent, or Firm*—Wenderoth, Lind & Ponack, L.L.P.

(57) ABSTRACT

It is intended to provide a dry fractionation method for fat whereby the performance for fractionating a fat into a high-melting fraction, a medium-melting fraction and a low-melting fraction can be improved to thereby preventing, in particular, the medium-melting fraction from worsening of the melting properties in the mouth and a decrease in the melting point with the passage of time and, in its turn, improving the melting properties in the mouth of a chocolate product which is produced by using the thus obtained hard butter for chocolates, etc. A method of fractionating a fat wherein a fraction (in particular, a medium-melting fraction) obtained by dry fractionation is efficiently separated from a high-melting fraction and a low-melting fraction mixed therewith. More specifically, a dry fractionation method which comprises heating a crystal fraction containing a large amount of 1,3-disaturated-2-unsaturated triglycerides to thereby melt the 1,3-disaturated-2-unsaturated triglyceride components followed by solid/liquid separation of tri-saturated triglycerides as a crystal fraction, thereby achieving a favorable performance of fractionating 1,3-disaturated-2-unsaturated triglycerides and saturated triglycerides.

10 Claims, 1 Drawing Sheet

U.S. PATENT DOCUMENTS

| | | |
|---|---|---|
| 5,401,867 A | 3/1995 | Sitzmann et al. |
| 5,556,972 A | 9/1996 | Keulemans et al. |

FOREIGN PATENT DOCUMENTS

| | | | |
|---|---|---|---|
| GB | 2 220 672 | | 1/1990 |
| WO | 96/05279 | | 2/1996 |
| WO | WO96/05279 | * | 2/1996 |

OTHER PUBLICATIONS

V. Gibon et al., "Latest trends in dry fractionation", Lipid Technology, vol. 14, Mar. 2002, pp. 33-36.

E. Deffense., "Dry multiple fractionation: trends in products and applications", Lipid Technology, vol. 7, No. 2, Mar. 1995, pp. 34-38.

T. Jeyarani et al., "Heat-Resistant Coca Butter Extenders from Mahua (*Madhuca latifolia*) and kokum (*Garcinia indica*) Fats", Journal of the American Oil Chemists Society, vol. 76, No. 12, 1999, pp. 1431-1436.

A. Tirtiaux, "Dry Fractionation", Lipid Technology, vol. 1, No. 1, Aug. 1, 1989, pp. 17-20.

Etienne Defense, "Dry multiple fractionation: trends in products and applications", Lipid Technology, vol. 7, No. 2, 1995, pp. 34-38.

Etienne Defense, "Dry fractionation technology in 2000", Eur. J. Lipid Sci. Technol., vol. 102, No. 3, 2000, pp. 234-236.

Hashimoto et al., "Preparation of sharp-melting hard palm midfraction and its use as hard butter in chocolate", J. Am. Oil Chem. Soc., vol. 78, No. 5, 2001, pp. 455-460.

* cited by examiner

DRY FRACTIONATION METHOD FOR FAT

This application is a U.S. national stage of International Application No. PCT/JP2003/012446 filed Sep. 29, 2003.

TECHNICAL FIELD

The present invention relates to a fractionation method for a fat having high fractionation performance of a crystalline fraction obtained by the fractionation step of the fat, particularly to a method useful for a fat that is a liquid or a solid at room temperature and melts at a temperature near body temperature such as a hard butter.

BACKGROUND ART

Representative fractionation methods of fats known in the art are categorized into a solvent fractionation method for fractionating a raw material fat with an organic solvent such as acetone or hexane, and a dry fractionation method without using any solvents. While a dry fractionation method is more preferable than a solvent fractionation method in terms of the cost and safety, it is a problem of this method that separation performance between a crystalline fraction and a liquid fraction is low as compared with a solvent fractionation method and a considerable liquid fraction gets mixed with a crystalline fraction. Accordingly, dry fractionation has been seldom used as a fractionation method in such a stage for obtaining a hard butter that molecular species have been increased after treatment in processing steps such as hydrogenation and interesterification, though a dry fractionation method may be employed in fractionation of a crude fat. On the other hand, while a solvent fractionation method has high solid/liquid separation performance, according to the present inventors' experience, there arise problems of a non-recovered crystalline fraction and mixing of a liquid fraction with respect to fractionation of an isomerization hydrogenated containing similar melting point fractions or similar molecular species, and the method is still insufficient.

Another method known in the art is removal of high-melting and low-melting point fractions by two-stage fractionation steps to obtain a medium-melting point fraction. In particular, a medium-melting point fraction obtained by fractionating an isomerization hydrogenated fat of, for example, palm oil is used for improving physical properties of chocolates as a substitute of cocoa butter. Fats used for chocolates are called as hard butters and include laurin fats in addition to cocoa butter and isomerization hydrogenated fats. A medium-melting point fraction obtained by solvent fractionation from an isomerization hydrogenated fat usually has poor melting properties in the mouth and no sharp melting curve as compared with cocoa butter and laurin fats. In addition, a medium-melting point fraction has such a defect that it separates into a high-melting point fraction and a low-melting point fraction with time to readily worsen melting properties and to tend to generate low temperature blooming. According to the inventors' experience, this is caused by insufficient fractionation due to, for example, the effect of incorporation of liquid oils into crystals during crystallization, separation performance at the time of filtration, and mutual solubilization of triglycerides having similar melting points. This is supposed to be due to time-dependent changes of a fat from a mixed crystal state at the beginning of crystallization, in which molecules are uniformly dispersed, to an eutectic state, in which molecules having similar melting points are aggregated together because of mixing of a high-melting point fraction and a low-melting point fraction into a medium-melting point fraction to cause worsening of melting properties and softening.

Particularly, in the production of a hard butter mainly composed of G2U, it has been difficult to efficiently remove components having higher melting point than G2U, typically GGG (G represents a saturated or trans-fatty acid residue) and GG-DG (diglyceride having two saturated or trans-fatty acid residues). When a hard butter having a large content of GGG is used for a chocolate, melting properties of the chocolate in the mouth become poor. Further, when a hard butter having a large content of GG-DG is used for a chocolate, there arise problems of crystallinity (cooling curve) and tempering properties of the chocolate.

Methods for enhancing solid/liquid separation efficiency in dry fractionation using an adsorbent and a crystallinity improving agent have been disclosed in JP 4-154897 A and JP 10-511420 A for improving the above drawbacks. However, these methods also have such problems as loss of fat components due to the adsorbent treatment and difficulty in removal of the crystallinity improving agent. Further, JP 4-306296 A discloses a method for improving solid/liquid separation efficiency by warming a solid fatty acid faction containing liquid fatty acids at a temperature below the melting point of the fraction to cause perspiration of liquid components. However, this method is different from the method of the present invention in that the disclosed method is a fractionation method using a humectant, i.e., a fractionation method using a solvent, and in that the disclosed method is not drawn to separation of similar triglycerides. Furthermore, JP 6-234695 A discloses a method for obtaining high purity crystals by pressing crystals after pressure crystallization, followed by causing perspiration by depressurization, and further pressing to enhance solid/liquid separation efficiency. This method is also different from the method of the present invention because it relates to a purification method of fatty acids.

DISCLOSURE OF THE INVENTION

An object of the present invention is to provide a dry fractionation method of a fat whereby fractionation performance of a crystalline fraction can be improved, thereby preventing, in particular, a medium-melting point fraction from worsening of the melting properties in the mouth and a decrease in the melting point with the passage of time and, in its turn, improving quality of chocolates as hard butter products which are produced by using the thus obtained hard butter for chocolates, etc.

The present inventors have studied intensively to achieve the above object. As a result, they have found, as a fractionation method of a fat, a method for efficiently separating fractions obtained by dry fractionation, particularly a high-melting point fraction and a low-melting point fraction mixed in a medium-melting point fraction. In particular, they have found a dry fractionation method having good fractionation performance for separating 1,3-di-unsaturated-2-triglycerides from tri-saturated-glycerides by raising a temperature of a crystalline fraction containing a large amount of 1,3-di-saturated-2-unsaturated triglycerides to melt the 1,3-di-saturated-2-unsaturated triglyceride component, followed by solid/liquid separation to obtain tri-saturated glycerides as a crystalline fraction. Thus, the present invention has been completed.

That is, the gist of the present invention is a dry fractionation method for fat which comprises the steps of: fractionating a raw material fat into a crystalline fraction (F) and a liquid fraction (L); melting a part of the crystalline fraction (F) by raising the temperature; and subjecting the fraction (F) to solid/liquid separation. The liquid fraction (L) can be further fractionated into a crystalline fraction (LF) and a liquid fraction (LL), followed by partially melting the crystalline fraction (LF) by raising the temperature, and subjecting the fraction (LF) to solid/liquid separation. The liquid fraction (FL) obtained from the F-fraction can be mixed with a crystalline fraction (LFF) obtained from the LF-fraction to prepare a medium-melting point fraction. Suitably, after melting a part of the F-fraction or a part of the LF-fraction by raising the temperature and before subjecting the fraction to solid/liquid separation, the fraction can be subjected to a temperature-lowering treatment, or temperature-raising and temperature-lowering treatments and, if necessary, collection of the crystalline fraction can be repeated so that the weight ratio of the crystalline fraction to the liquid fraction after fractionation or solid/liquid separation in each step is 8:2 to 2:8, preferably 7:3 to 3:7, and the proportion of the liquid component remaining in the crystalline fraction obtained in each step is 15% by weight or less, preferably 10% by weight or less at a fractionation temperature. Preferably, the crystalline fraction (F) contains G2U and glycerides having a higher melting point than G2U. The crystalline fraction (F) can be obtained by subjecting a raw material fat containing G2U and GU2 to crystallization and solid/liquid separation to fractionate it into a crystalline fraction (F) in which G2U is concentrated and a liquid fraction (L) in which GU2 is concentrated, wherein G denotes a saturated or trans-fatty acid residue, U denotes a cis-unsaturated fatty acid residue, and G2U denotes a triglyceride having two G residues and one U residue. The G2U is preferably 1,3-di-saturated-2-unsaturated triglycerides, wherein the saturated fatty acid residues have 16 to 22 carbon atoms. The raw material fat may be a vegetable butter, an interesterified fat or a fractionated crystalline fraction thereof. Or, the raw material fat may be an isomerization hydrogenated fat, in particular, that having a trans acid content of 30% or more.

BEST MODE FOR PERFORMING THE INVENTION

Figure 1:
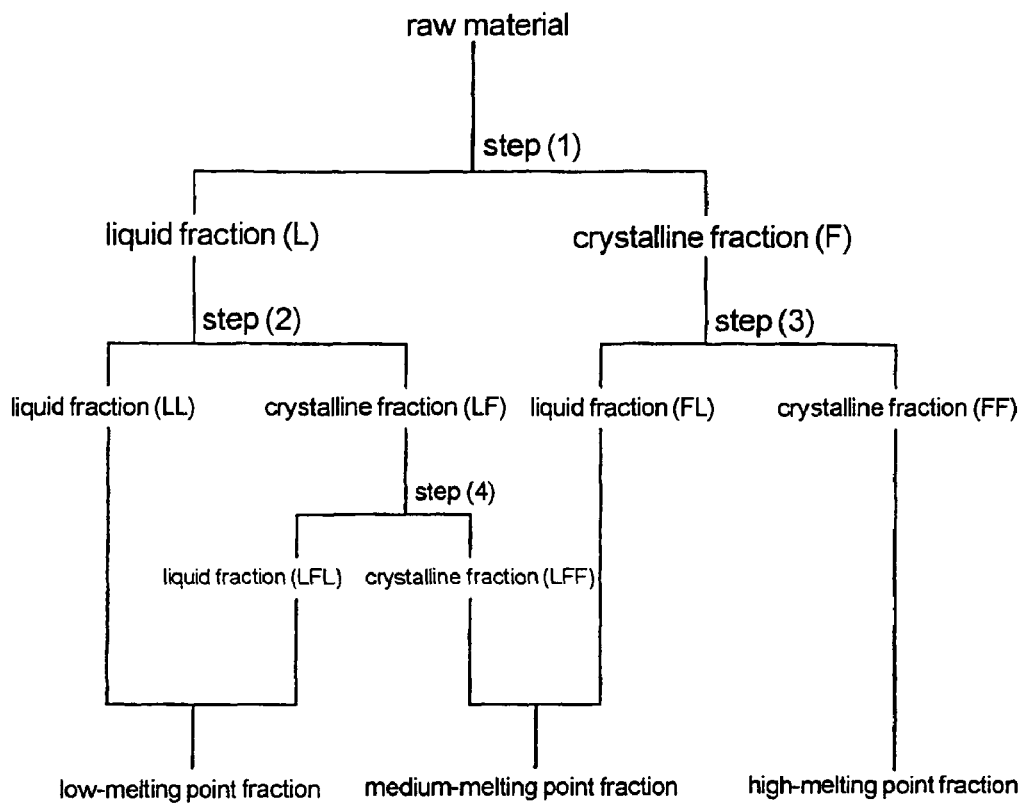
FIG. 1 shows a flow chart of the dry fractionation.

Embodiments of the present invention will illustrated below. The preferred raw material fat of the present invention is a vegetable butter, an interesterified fat or a crystalline fraction obtained by fractionation thereof, or an isomerization hydrogenated fat. Examples of the vegetable butter include vegetable fats such as palm oil, soybean oil, rapeseed oil, corn oil, cotton seed oil, sunflower oil, coconut oil and shea fat. They can be used alone or a mixed fat thereof can be used. Preferably, a partially or totally hydrogenated, or interesterified fat thereof containing G2U and GU2 can be used. The fat is subjected to crystallization and solid/liquid separation at a temperature in the range lower than the crystallization temperature of G2U and higher than the crystallization temperature of GU2 to fractionate it into a crystalline fraction (F) in which G2U is concentrated and a liquid fraction (L) in which GU2 is concentrated, and the crystalline fraction (F) obtained is used. While the crystalline fraction (F) may be that obtained by solvent fractionation, the crystalline fraction (F) can be easily obtained by dry fractionation from the view point of production facilities because no solvent removal is required.

The isomerization hydrogenated fat to be used as the raw material fat refers to isomerization of cis-unsaturated fatty acids into trans-unsaturated fatty acids at the time of hydrogenation (hardening) of a fat, or a fat obtained at the time of hydrogenation of highly unsaturated fatty acids to mono-unsaturated fatty acids. For example, while naturally occurring oleic acid is a cis-acid, the trans type acid of oleic acid is elaidic acid. While the melting point of oleic acid is about 10° C., elaidic acid has a higher melting point of about 45° C. This mean that, although a fatty acid becomes to have increased molecular species and its composition is more complicated by isomerization hydrogenation, the trans-acid has a closer molecular structure to a saturated fatty acid than the cis-acid has, and its melting point is raised, and thus a fat having a sharp melting curve can be produced. The trans-acid content of an isomerization hydrogenated fat is preferably 30% or more, because a high yield of a medium-melting point fraction as a fat having a sharp melting curve is hardly expected when the content is less than 30%. The trans-acid content may be determined according to AOCS Official Method Ce 1c-89.

G2U is a triglyceride in which two saturated or trans-fatty acid residues and one cis-unsaturated fatty acid residue are linked, where G denotes a saturated or trans-fatty acid residue and U denotes a cis-unsaturated fatty acid residue. Examples of the glyceride having a higher melting point than G2U include GGG, i.e., a triglyceride in which three saturated or trans-fatty acid residues linked, for example 1,3-distearo-2-palmitoyl glyceride (StPSt), and GG-DG, i.e., a diglyceride in which two saturated or trans-fatty acid residues linked, such as 1,2-distearoyl glyceride (StSt-DG). The fat containing G2U and glycerides having a higher melting point than G2U is, for example, that containing 60% by weight or more of G2U as a main component and 1% by weight or more of glycerides having a higher melting point (GGG+GG-DG), wherein examples of the G2U type include GUG and GGU types.

For fractionating higher melting point glycerides from a fat containing G2U as a main component and a small amount of the higher melting point glycerides, the following two methods can be considered. One is a solvent fractionation method, wherein the fat is dissolved in a solvent by warming and then crystals are precipitated by cooling to perform fractionation. The other is a dry fractionation method, wherein the fat is completely melted by heating and then crystals are precipitated by cooling to perform fractionation. However, when the content of the higher melting point glycerides is small relative to the content of the main component, it is quite difficult to selectively crystallize the higher melting point glycerides in either fractionation method. Nevertheless, in the method of the present invention, wherein the fat including the main component is crystallized and then partially melted by raising the temperature, glycerides other than the higher melting point glycerides are allowed to readily melt by taking advantage of a difference in solubility of the main component and the high-melting point glycerides in a liquid fraction, thereby enabling a small amount of the higher melting point glycerides to be separated from the main component.

In dry fractionation, a fat can be subjected to solid/liquid separation by temperature control without using any solvents such as organic solvents and water to fractionate and form a fat having different hardness and melting point from those of the raw material fat, thereby diversifying physical properties and expanding applications. The solid/liquid separation refers to separation of a liquid fraction from a crystalline fraction, but a part of the liquid fraction may be left in the crystalline fraction. Usually, a medium-melting point is a higher melting point fraction obtained by fractionating a fat into a crystalline fraction and a liquid fraction and then subjecting the resulting liquid fraction to further fractionation, and typically, a medium-melting point fraction is used as a hard butter for, for example, chocolates and coatings. Then, a medium-melting point fraction obtained by fractionation so as to have a melting point close to body temperature can be used as a valuable fat such as a hard butter for chocolates that favorably melts in the mouth.

Although the crystalline fraction (F) may be used for a hard butter, it contains G2U and higher melting point glycerides (GGG and GG-DG), and these GGG and GG-DG tend to deteriorate functions of such a hard butter. Then, the temperature of the crystalline fraction is raised so that the fraction is partially melted, thereby higher melting point glycerides are left and concentrated in a crystalline part to perform solid/liquid separation.

For partially melting the crystalline fraction in which solids have remained un-melted by raising the temperature, the crystalline fraction is raised to a temperature, at which G2U is melted while the glycerides having a higher melting point than G2U are not melted, as uniform as possible. For uniformly raising the temperature, for example, the crystalline fraction is allowed to stand for a given period of time or longer in a space where the environment temperature is controlled at the desired temperature. In this case, the time period required for uniformly raising the temperature can be shortened by crushing or pulverizing the crystalline fraction (AF) to increase the surface area of the crystalline fraction (AF). In addition, the temperature can be more uniformly raised by stirring.

When the solid/liquid separation is performed, the temperature-controlled fraction may be allowed to stand or may be stirred. In case of stirring, preferably, the number of revolution should be that does not collapse crystals. An example of each fractionation step of the present invention is shown in FIG. 1. In step (1), the raw material fat is fractionated into the crystalline fraction (F) and the liquid fraction (L). In step (2), the liquid fraction (L) is further fractionated into the crystalline fraction (LF) and the liquid fraction (LL) to finally obtain the high-melting point, medium-melting point and low-melting point fractions. In this method, the liquid fraction (FL) remaining in the F-fraction (see step (3)), and the crystalline fractions (LFF) obtained by removing the liquid fraction (LFL) remaining the LF fraction (see step (4)) are mixed to obtain the medium-melting point fraction. The weight ratio of the crystalline fraction to the liquid fraction is controlled to be 8:2 to 2:8, preferably 7:3 to 3:7, during the fractionation steps of the present invention. The liquid fraction can be hardly separated from the crystalline fraction when the weight ratio of the crystalline fraction exceeds 80%, while it is not easy to perform fractionation when the weight ratio of the liquid fraction exceeds 80% since the crystalline fraction is hardly crystallized in the liquid fraction due to mutual dissolution.

The temperature of crystalline fraction (F) obtained in step (1), or the crystalline fraction (LF) obtained in step (2) is raised so as to melt a part of each fraction to perform solid/liquid separation. When only a part of each fraction is melted, in case of F-fraction, the crystalline fraction (FF) in the F-fraction, or the liquid fraction (FL) in the F-fraction is separated as a liquid from a solid, respectively. Fractionation of the partially melted product permits the residual ratio of the other fraction in each fraction can be decreased. Likewise, in case of the fractionation of the LF fraction the residual ratio of the other fraction in each fraction can be also decreased by the same treatment as described above. Preferably, solid/liquid separation is repeated until the proportion of the liquid component remaining in the crystalline fraction obtained by each fractionation step is 15% by weight or less, preferably 10% by weight or less. Melting properties of a chocolate in the mouth can be improved, or softening of a chocolate with time can be prevented when the medium-melting point fraction is used for hard butter products such as chocolates, by lowering the residual ratio of the other fraction in each fraction, particularly, the residual ratios of the high-melting point fraction and low-melting point fraction in the medium-melting point fraction. When the proportion of the liquid fraction remaining in the crystalline fraction obtained in each fractionation step exceeds 15% by weight, melting properties of a chocolate in the mouth and the effect for preventing a chocolate from being softened with time may be deteriorated.

In the solid/liquid separation by melting a part of each crystalline fraction (F) or crystalline fraction (LF) by raising the temperature, a fresh liquid component is formed by raising the temperature so that only a part of the fractionated crystals are melted, and the liquid component is fractionated by, for example, press filtration or suction filtration. When the raw material fat is an isomerization hydrogenated fat, in particular, various kinds of molecular species are contained due to formation of elaidic acid. Then, fractionation performance can be improved by performing a temperature-lowering treatment after melting a part of the F fraction or the LF fraction by raising the temperature and before solid/liquid separation of the fraction. Examples of a temperature cycle for raising the temperature where a part of the fraction is melted and lowering the temperature after melting a part of the fraction and before solid/liquid separation of the fraction include one cycle of maintaining a lower limit temperature for 11.5 hours, raising a temperature to an upper limit temperature in 0.5 hours, maintaining the upper limit temperature for 11.5 hours, and then lowering the temperature to the lower limit temperature in 0.5 hours in one day. However, the cycle is not specifically limited in so far as the fraction can be maintained for a period sufficient for exposing it to the upper limit and lower limit temperatures. Therefore, one cycle can be performed, for example, within several tens minutes to several days.

The upper limit and lower limit temperatures for the cycle can be determined by using a DSC (differential scanning calorimeter). For example, the upper limit temperature is defined as the temperature of the peak of the high-melting point fraction contained in the crystalline fraction (F) (the peak temperature is confirmed in the state of crystals as such without melting). The lower limit temperature is defined as the melting point of the desired medium-melting point fraction (about 35° C. as a hard butter product such as a chocolate). Further, the upper limit temperature of the crystalline fraction (LF) is defined as the temperature of the peak of the medium-melting point fraction which is confirmed in the state of crystals as such without melting by DSC. The lower limit temperature is defined as the melting point of a component that is responsible for softening of a chocolate. Fractionation performance is improved by setting the upper and lower limit temperatures so that they match the melting point of the other fraction remaining in each fraction.

Figure 2:
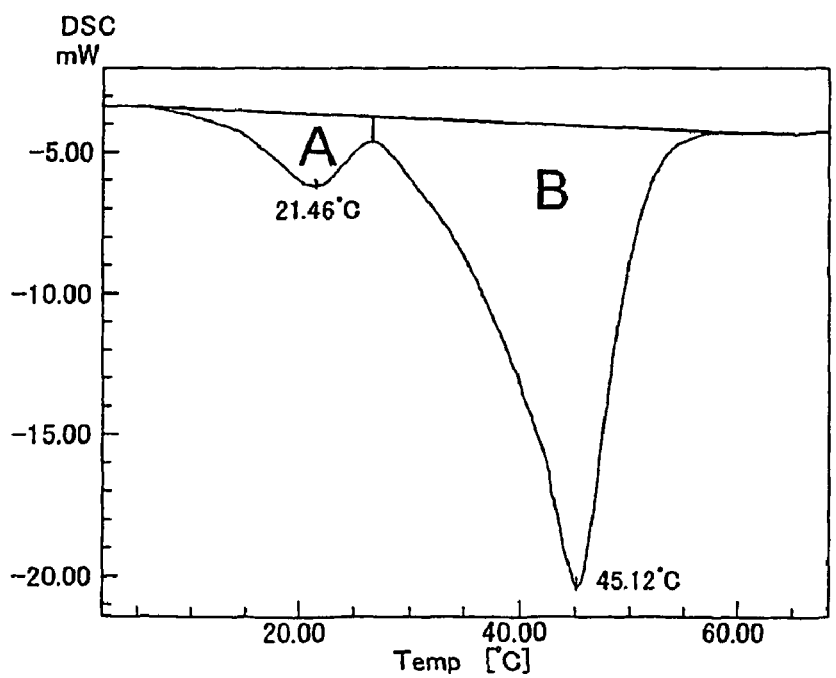
FIG. 2 is a graph showing the results of DSC measurement of the crystalline fraction (FF) in Example 1 after the temperature cycle step.

In case of an isomerization hydrogenated fat, preferably, one or more temperature cycles are performed, and the preferred cycle number can be determined based on the result of the DSC measurement. That is, whether crystals obtained by separation and fractionation should be further subjected to an additional temperature cycle under the same temperature conditions after a given number of cycles can be judged by DCS measurement. While re-fractionation is not required when the proportion of the peak area (A) in the temperature region at and below the lower limit temperature at the peak after fractionation as shown in FIG. 2 is 15% or less relative to the total peak area (A+B) (i.e., when the ratio satisfies the relation of $A/(A+B) \times 100 \leqq 15$). However, when the proportion exceeds 15%, preferably, the temperature cycle is repeated to perform the temperature-raising and temperature-lowering treatments and, if necessary, separation and fractionation the proportion becomes 15% or less. More preferably, fractionation is repeated until the proportion becomes 10% or less. When a fraction having the proportion exceeding 15% is used as a medium-melting point fraction for a hard butter product such as a chocolate, melting properties in the mouth becomes poor, and the problem of softening of the chocolate with time is hardly solved.

Preferably, the temperature-raising and temperature-lowering treatments as well as the fractionation of crystals are repeated until the proportion of the liquid component remaining in the crystalline fraction becomes 15% by weight or less. In particular, when the temperature-lowering treatment is performed, the fractionation can be performed by press filtration after storing the fraction in an environment at the temperature-lowering temperature (preferably storing for 2 hours or longer). Press filtration is a method for fractionation of a liquid fraction from a crystalline fraction by applying pressure, and a method using a filter press is included in this method. The filtration pressure can be appropriately adjusted depending on the amount of crystals.

The high-melting point glycerides are concentrated in the crystalline part by melting a part of the crystalline fraction by raising the temperature, and the high-melting point glycerides can be fractionated by solid/liquid separation of the partially melted product. When G2U in the crystalline fraction is 1,3-di-saturated-2-unsaturated triglycerides (SUS: S=saturated fatty acid residue, U=cis-saturated fatty acid residue), it has been quite difficult to fractionate it into SUS, SSS and SS-DG by a conventional dry fractionation method, i.e., by fractionation by cooling and solidification after melting the entire fraction. When high-melting point glycerides (SSS) are crystallized by cooling after melting the entire crystalline fraction to perform solid/liquid separation in a conventional dry fractionation method, SUS also crystallizes with time to deteriorate the quality and yield of the liquid part and make it difficult to perform solid/liquid separation with a filter press.

Examples of the saturated fatty acid residue (S) in SUS include those having 16 to 22 carbon atoms (C16: palmitic acid, C18: stearic acid, C20: arachidic acid, C22: behenic acid). The number of double bonds in the cis-unsaturated fatty acid residue (U) of SUS is not specifically limited but, in particular, oleic acid having one double bond is preferred. Examples of SUS include 1,3-distearo-2-oleoyl glyceride (StOSt), 1,3-dipalmytoyl-2-oleoyl glyceride (POP) and 1-palmyto-3-stearo-2-oleolyl glyceride (POSt). The temperature-raising is performed under such temperature conditions that G2U is melted, while glycerides having a higher melting point than G2U are not melted so as to perform solid/liquid separate. Further, the temperature-raising can be performed under temperature conditions suitable for particular molecular species. For example, in case of StOSt, the temperature suitable for partial melting it is 40 to 45° C. When the temperature is lower than 40° C., StOSt component is also solidified to make it difficult to perform solid/liquid separation. On the other hand, the temperature exceeds 45° C., the entire fraction tends to be melted. Further, when the temperature-raising is performed in the range of 42 to 44° C., separation performance of the StOSt component from the glycerides having a higher melting point than it can be improved. In case of a fat containing a large amount of POP, the temperature range of 27 to 30.5° C. is suitable.

When the temperature to be raised is low, the proportion of the molted crystalline fraction (F) decreases. Consequently, a larger amount of high-melting point triglycerides are removed, and the yield of the crystalline fraction in which G2U is concentrated tends to be decreased. Further, when the temperature to be raised is low, the press filtration requires a longer period of time and, regarding the quality, separation performance of high-melting point glycerides (GGG and GG-DG) tends to be decreased. When the temperature to be raised is too low, G2U is not melted, which results in difficulty in solid/liquid separation. When the temperature to be raised is high, the yield increases due to increase in an amount of the melted crystalline fraction (AF) but, regarding the quality, separation performance of high-melting point glycerides (GGG and GG-DG) tends to be decreased because high-melting point triglycerides are also melted.

The medium-melting point fraction of the present invention can be used for hard butter products such as chocolates. The melting point of the medium-melting point fraction used for hard butter products is preferably in the range of 30 to 35° C. The medium-melting point fraction obtained by using an isomerization hydrogenated fat as the raw material fat can be used for a non-tempering type chocolate including a chocolate bar and a coating chocolate for baked confectionery such as biscuits. The chocolate bar and coating chocolate using the medium-melting point fraction of the present invention has good melting properties in the mouth without causing softening with time.

The method for solid/liquid separation after the temperature-raising operation is not specifically limited in so far as it can be separate a solid from a liquid and, for example, press filtration, suction filtration, spontaneous filtration and centrifugal separation can be employed. Press filtration is preferred from the view point of the desired yields of crystalline and liquid fractions and the quality thereof. The degree of pressurization (press) at the time of press filtration is not specifically limited, and can be adjusted so that the crystalline fraction is separated from the liquid fraction with preventing the crystalline fraction from melting by the pressurization. Further, the degree of mesh of the filter for fractionation is not specifically limited and can be selected according to the particle diameter of the crystalline fraction.

EXAMPLES

The present invention will be further illustrated in detail by the following Examples, but the present invention is by no means limited by the Examples.

Example 1

Palm olein was used as a fat, and was subjected to isomerization hydrogenation to obtain isomerization hydrogenated palm oil (IV=52.9) containing 40.3% of trans-acids. The isomerization hydrogenation was performed at a hydrogen pressure of 0.2 Kg/cm$^2$ and a temperature of 200° C. using methionine as a hydrogenation catalyst. The isomerization hydrogenated palm oil was completely melted at 60° C., followed by allowing to stand for 12 hours at 25° C. with stirring at 23 rpm. Then, the oil was fractionated by suction filtration to obtain a crystalline fraction (F) and a liquid fraction (L). The yield of the liquid fraction (F) was 54%.

A temperature cycle was determine based on the results of a DSC measurement of the crystalline fraction (amount of sample: 10 mg, measuring temperature: 0 to 60° C., temperature raising speed: 5° C./min., measuring apparatus: SHIMADZU DSC 50). The crystalline fraction was placed in an environment of the temperature cycle (at 35° C. to 45° C.) and was subject to one cycle per day (storing at the lower limit temperature for 11.5 hours, raising the temperature to the upper limit temperature in 0.5 hours, storing at the upper limit temperature for 11.5 hours, and then lowering the temperature to the lower limit temperature in 0.5 hours). Then, the crystalline fraction was stored at the lower limit temperature for 2 hours or longer, and filtered by pressing at 35° C. to obtain a crystalline fraction (FF) of a high-melting point fraction, in which the amount of a medium-melting point fraction was decreased, and a liquid fraction (FL). Subsequently, the liquid fraction (L) was completely melted at 60° C. and the fraction was allowed to stand at 15° C. for 12 hours with stirring at 23 rpm, followed by subjecting to fractionation with suction filtration to obtain a crystalline fraction (LF) and a liquid fraction (LL). The yield of the crystalline fraction was 60%. Similarly, a temperature cycle was determined based on the results of DSC measurement and the fraction was placed in an environment of the temperature cycle (18° C. to 28° C.) and was subjected to one cycle per day. The fraction was filtered by pressing at 18° C. to obtain crystals of a medium-melting point fraction in which the amount of a low-melting point fraction was decreased. The temperature cycle was performed twice. The liquid fraction (FL) obtained at first and the crystalline fraction (LF) obtained in the next step were mixed and used as a medium-melting point fraction. The yields of the high-melting point fraction (FF), medium-melting point fraction (FL+LF) and low-melting point fraction (LL) obtained were 26%, 43% and 31%, respectively.

Comparative Example 1

The same raw material as used in Example 1 was completely melted at 60° C. The raw material fat was mixed with hexane in a mixing ratio of 1:4 (weight ratio), and was cooled to 5° C., followed by separation and fractionation to obtain a crystalline fraction (high-melting point fraction) and a liquid fraction. Subsequently, the fractionated liquid fraction was cooled to −23° C., followed by separation and fractionation to obtain a crystalline fraction (medium-melting point fraction) and a liquid fraction (low-melting point fraction). The yields of the high-melting point fraction, medium-melting point fraction and low-melting point fraction obtained were 20%, 55% and 25%, respectively.

Comparative Example 2

The same raw material as used in Example 1 was completely melted at 60° C. The raw material fat was mixed with hexane in a mixing ratio of 1:4 (weight ratio), and cooled to 0° C., followed by separation and fractionation to obtain a crystalline fraction and a liquid fraction. Subsequently, the fractionated liquid fraction was cooled to −19° C. to obtain a crystalline fraction and a liquid fraction. The yields of the high-melting point fraction, medium-melting point fraction and low-melting point fraction obtained were 40%, 28% and 32%, respectively.

Comparative Example 3

The same raw material as used in Example 1 was completely melted at 60° C. The material was allowed to stand at 34° C. for 12 hours with stirring at 23 rpm, followed by fractionation with suction filtration to obtain a crystalline fraction and a liquid fraction. Subsequently, the liquid fraction was completely melted at 60° C., and was mixed with the low-melting point fraction (the fraction obtained in Example 1) in a mixing ratio of 2:3 (weight ratio). The mixture was allowed to stand at 30° C. for 12 hours with stirring at 23 rpm, followed by fractionation with suction filtration to obtain a crystalline fraction and a liquid fraction. The yields of the high-melting point fraction, medium-melting point fraction and low-melting point fraction obtained were 23%, 47% and 30%, respectively.

Each of the medium-melting point fractions obtained in Example 1 and Comparative Examples 1, 2 and 3 was placed in an environment of a temperature cycle (17° C. to 30° C., 25° C. to 35° C.) and subjected to the temperature cycle once a day to raising the temperature and lowering the temperature. The fraction was cooled to 5° C., and the weight ratio between the high-melting point fraction and the low-melting point fraction mixed in the medium-melting point fraction in a sample was confirmed by DSC. The results are shown in Table 1. As seen from the results, the amounts of the high-melting point and low-melting point fractions got mixed in the medium-melting point fraction in Example 1 were lower than those in Comparative Examples 1, 2 and 3.

TABLE 1

Comparison of the Amounts of High-Melting Point and Low-melting Point Fractions Mixed in Medium-Melting Point Fraction

|  | Example 1 | Comparative Example 1 | Comparative Example 2 | Comparative Example 3 |
|---|---|---|---|---|
| Amount of High-Melting Point Fraction | — | 15.3 | — | 24.2 |
| Amount of Medium-Melting Point Fraction | 88.8 | 68.6 | 87.9 | 59.9 |
| Amount of Low-Melting Point Fraction | 11.2 | 16.1 | 12.1 | 15.9 |

* High-Melting Point Fraction: Peak area ratio of the fraction having a peak at 35° C. or higher relative to the total fractions
* Medium-Melting Point Fraction: Peak area ratio of the fraction having a peak at 18° C. to 25° C. relative to the total fractions
* Low-Melting Point Fraction: Peak area ratio of the fraction having a peak at lower than 18° C. relative to the total fractions According to the formulation shown in Table 2, a liquid chocolate was prepared by a conventional method using each of the medium-melting point fractions in Example 1 and Comparative Examples 1, 2 and 3. The liquid chocolate was cast into a mold at 45° C., followed by cooling at 5° C. for 30 minutes to obtain a chocolate. The sample was tested in terms of sensory evaluation (melting properties in the mouth) and anti-blooming test. In the anti-bloom test, incidence of blooming was confirmed in an environment with one temperature varying cycle per day (17° C. to 30.5° C.). The results are shown in Table 3. The medium-melting point fraction in Example 1 has clearly better melting properties in the mouth as compared with the fractions obtained by solvent fractionation in Comparative Examples 1, 2 and 3.

TABLE 2

| Formulation of Chocolate | (Parts by Weight) |
|---|---|
| Cacao mass | 9.0 |
| Cocoa powder | 2.3 |
| Whole milk powder | 7.0 |
| Skim milk powder | 7.0 |

TABLE 2-continued

| Formulation of Chocolate | (Parts by Weight) |
|---|---|
| Powdered sugar | 46.7 |
| Middle-melting point fraction | 28.0 |
| Lecithin | 0.4 |

TABLE 3

Melting Properties in the Mouth and Anti-Blooming of Chocolate

| | Example 1 | Comparative Example 1 | Comparative Example 1 | Comparative Example 1 |
|---|---|---|---|---|
| Melting properties in the Mouth | ◉ | Δ | ○ | Δ |
| Anti-Blooming (Day 4) | − | − | − | − |
| Anti-Blooming (Day 10) | − | − | − | − |
| Anti-Blooming (Day 20) | − | − | − | − |
| Anti-Blooming (Day 30) | − | − | − | − |
| Anti-Blooming (Day 60) | − | − | − | − |
| Anti-Blooming (Day 90) | − | + | − | + |
| Anti-Blooming (Day 120) | + | + | + | + |

\* Melting properties in the mouth: ◉ Excellent, ○ Good, Δ a little poor
\* anti-Blooming: − Good, + Blooming The above results show that, by improving fractionation performance of high-melting point, medium-melting point and low-melting point fractions in the steps for fractionating the raw material fat, the resulting medium-melting point fraction can be used as a fat which can provide a hard butter product such as a chocolate using the medium-melting point fraction with good melting properties in the mouth.

Production of fat containing G2U and GU2

Ethyl stearate and high-oleic sunflower oil were subjected to an interesterification reaction using a 1,3-posiiton specific lipase as a catalyst, and then ethyl esters were distilled off to prepare an interesterified fat. After completely melting the interesterified fat (containing StOSt, StOO, StStSt, etc.) at 50° C. or higher, the fat was solidified at 23° C. (the product temperature of 23° C.), followed by solid/liquid separation by press filtration to obtain a crystalline fraction (yield 50%). The contents of StOSt, StOO, StStSt and StSt-DG in the crystalline fraction are shown below. The composition was analyzed by high performance liquid chromatography.

TABLE 4

| | StOSt | StOO | StStSt | StSt-DG |
|---|---|---|---|---|
| Crystalline fraction | 68.2% | 8.9% | 1.6% | 1.4% |

Example 2

After crushing the above crystalline fraction solidified at 23° C., the entire crystalline fraction was melted in a melting vessel with heating. The melting vessel used was equipped with a heating coil in a stainless steel vessel with a size of 380 mm (width) ×380 mm (length) ×400 mm (height), and warm water at a constant temperature was circulated in the coil. After raising the temperature of the crystalline fraction to 43.0° C., the fraction was kept at the temperature for about 120 minutes with stirring at 30 rpm. The fraction was filtered by pressing with a filter press to perform solid/liquid separation, thereby removing a crystalline part in which high-melting point glycerides were concentrated and obtaining a liquid part. The composition (% by weight) of the high-melting point glycerides and representative G2U and GU2 in the liquid part are shown in Table 5.

According to the same manner as that in Example 1, solid/liquid separation was performed to remove a crystalline part in which high-melting point glycerides were concentrated, thereby obtaining a liquid part, except that the temperature of the crystalline fraction was raised to 40.5° C. The composition (% by weight) of the high-melting point glycerides and representative G2U and GU2 in the liquid part are shown in Table 5.

Example 3

According to the same manner as that in Example 1, solid/liquid separation was performed to remove a crystalline part in which high-melting point glycerides were concentrated, thereby obtaining a liquid part, except that the temperature of the crystalline fraction was raised to 44.5° C. The composition (% by weight) of the high-melting point glycerides and representative G2U and GU2 in the liquid part are shown in Table 5.

Comparative Example 4

According to the same manner as that in Example 1, solid/liquid separation was performed to remove a crystalline part in which high-melting point glycerides were concentrated, thereby obtaining a liquid part, performed to obtain a liquid part, except that the temperature of the crystalline fraction was raised to 39.0° C. The composition (% by weight) of the high-melting point glycerides, and representative G2U and GU2 in the liquid part are shown in Table 5.

Comparative Example 5

According to the same manner as that in Example 1, solid/liquid separation was performed to remove a crystalline part in which high-melting point glycerides were concentrated, thereby obtaining a liquid part, except that the temperature of the crystalline fraction was raised to 46.0° C. The compositions (% by weight) of the high-melting point glycerides and representative G2U and GU2 in the liquid part are shown in Table 5.

TABLE 5

Composition of Liquid Part

| | Example 1 | Example 2 | Example 3 | Comparative Example 4 | Comparative Example 5 |
|---|---|---|---|---|---|
| Heating Temperature | 43.0° C. | 40.5° C. | 44.5° C. | 39.0° C. | 46.0° C. |
| StSt-DG | 0.7 | 0.8 | 0.9 | — | 1.4 |
| StStSt | 0.6 | 0.6 | 0.8 | — | 1.6 |
| StOSt | 69.2 | 69.5 | 68.5 | — | 68.2 |
| StOO | 8.5 | 8.6 | 8.7 | — | 8.9 |

Solid/liquid separation could not be performed in Comparative Example 4 because the raising temperature was too low. Solid/liquid separation could not be performed in Comparative Example 5 either because the sample was completely dissolved due to the high raising temperature.

In Examples 1, 2 and 3, the high-melting point glycerides were desirably fractionated.

Chocolate Test

Chocolates were produced using samples of the products in Examples 1 to 3 and Comparative Examples 5, and qualities thereof such as melting properties in the mouth were confirmed. The chocolates were produced according to a conventional method.

| Formulation of Chocolate | (Parts by Weight) |
|---|---|
| Cacao mass | 15.0 |
| Whole milk powder | 20.0 |
| Powdered sugar | 45.0 |
| Fat to be tested | 20.0 |
| Lecithin | 0.4 |
| Vanillin | 0.02 |

* Fat to be tested: crystalline fraction (Examples 1 to 3, and Comparative Example 5)/fractionated palm oil = 45/55

Sensory test was performed by five panel persons after storing the molded chocolate at 20° C. for 1 week. The results are shown in Table 6.

TABLE 6

| | Sensory Test | |
|---|---|---|
| Test product | Chew Feeling | Melting Properties in Mouth |
| Example 1 | ◎ | ◎ |
| Example 2 | ○ | ○ |
| Example 3 | ○ | ○ |
| Comparative Example 5 | Δ | X |

Evaluation: ◎-○ good, Δ a little poor, X poor

Example 4

A high-melting point glyceride (PPP: tripalmitate glycerol) contained in a palm medium-melting point fraction (PMF: POP content 46.5%, PPP content 1.31%) obtained from palm oil by a dry fractionation method was fractionated. The fractionation method was as follows. After crushing solidified PMF by cooling, it was melted with heating in a melting vessel. The melting vessel used for heat melting had been used for an interesterification reaction between ethyl stearate and high-oleic sunflower oil using 1,3-position specific lipase as a catalyst. After raising the temperature of PMF to 29.0° C., it was kept at that temperature for a given time period (about 1 hour), followed by solid/liquid separation with a filter press. The compositions (% by weight) of POP and of PPP contained in the liquid part are shown in Table 7.

Example 5

According to the same manner as that in Example 4, solid/liquid separation was performed to remove a crystalline part in which high-melting point glycerides were concentrated, thereby obtaining a liquid part, except that the temperature of PMF was raised to 29.1° C. The composition (% by weight) of POP and PPP contained in the liquid is are shown in Table 7.

Example 6

According to the same manner as that in Example 4, solid/liquid separation was performed to remove a crystalline part in which high-melting point glycerides were concentrated, thereby obtaining a liquid part, except that the temperature of PMF was raised to 30.0° C. The composition (% by weight) of POP and PPP contained in the liquid is are shown in Table 7.

Comparative Example 6

According to the same manner as that in Example 4, solid/liquid separation was performed to remove a crystalline part in which high-melting point glycerides were concentrated, thereby obtaining a liquid part, except that the temperature of PMF was raised to 26.5° C. The composition (% by weight) of POP and PPP contained in the liquid is are shown in Table 7.

Comparative Example 7

According to the same manner as that in Example 4, solid/liquid separation was performed to remove a crystalline part in which high-melting point glycerides were concentrated, thereby obtaining a liquid part, except that the temperature of PMF was raised to 30.7° C. The composition (% by weight) of POP and PPP contained in the liquid is are shown in Table 7.

TABLE 7

| | Example 4 | Example 5 | Example 6 | Comparative Example 6 | Comparative Example 7 |
|---|---|---|---|---|---|
| Heating Temperature | 29.0° C. | 29.1° C. | 30.0° C. | 26.5° C. | 30.7° C. |
| POP | 46.4 | 46.3 | 46.3 | 44.2 | 46.4 |
| PPP | 0.57 | 0.49 | 0.85 | 0.58 | 1.18 |

In Examples 4 to 6, the PPP content became 1.0% or less. Therefore, high-melting point glycerides could be fractionated. In Comparative Example 6, although the PPP content was reduced to 1.0% or less, the POP fraction was left in the crystalline part and the POP content in the liquid part was decreased because the raising temperature was low. The viscosity of PMF at 26.5° C. was so high that sufficient press filtration could not be performed.

Comparative Example 8

After completely melting the same interesterification oil (containing StOSt, StOO, StStSt, etc.) as used in Example 2 at a temperature of 50° C. or more, the oil was solidified at 23° C. (the product temperature 23° C.), and a crystalline fraction was obtained by solid/liquid separation with filtration by pressing (yield 50%). The crystalline fraction was completely melted at 70° C. according to a conventional dry fractionation method, and was cooled to a product temperature of 38° C. in 1 hour with stirring at 15 rpm. Then, the temperature was kept for 1 hour, and the product temperature was cooled to 31° C. in 30 minutes. After keeping the product temperature at 31° C. for 2 hours, it was heated to 39° C. After keeping the temperature at 39° C. for 1 hour, solid/liquid separation was performed by centrifugation (1800 G, 5 minutes) to separate high-melting point glycerides. When solid/liquid separation was performed with a filter press, the filter was clogged and separation was hardly performed. The composition (% by weight) of the high-melting point glycerides and of representative G2U and GU2 in the liquid part after separation are shown in Table 8.

TABLE 8

| | Comparative Example 8 |
|---|---|
| StSt-DG | 0.8 |
| StStSt | 0.9 |
| StOSt | 68.5 |
| StOO | 8.7 |

In Comparative Example 8, the high-melting point glycerides (StSt-DG and StStSt) could be removed to the same extent as in Examples 1 to 3 considering the content thereof. However, since crystals were precipitated with time during solid/liquid separation by centrifugation in the separation work in Comparative Example 5, and the yield of the liquid part was about 30% lower than the yield in Examples 1 to 3.

INDUSTRIAL APPLICABILITY

As described above, fractionation performance could be improved by performing solid/liquid separation after partially melting a crystalline fraction by raising a temperature in a dry fractionation method of a fat, thereby preventing, in particular, a medium-melting fraction from worsening of melting properties in the mouth and a decrease in a melting point with the passage of time and, in its turn, improving melting properties in the mouth of a chocolate product which is produced by using the thus obtained hard butter for chocolates, etc.

The invention claimed is:

1. A dry fractionation method for fat which comprises the steps of:
   fractionating an interesterified fat or a fractionated crystalline fraction thereof, or an isomerization hydrogenated fat into a crystalline fraction (F) and a liquid fraction (L);
   melting a part of the crystalline fraction (F) by raising the temperature so that G2U is melted while the glycerides having a higher melting point than G2U are not melted, wherein G denotes a saturated or trans-fatty acid residue and U denotes a cis-unsaturated fatty acid residue; and
   subjecting the resulting crystalline fraction (F) to a temperature-lowering treatment followed by subjecting to solid/liquid separation to obtain a liquid fraction (FL) and a crystalline fraction (FF),
   wherein the liquid fraction (L) is further fractionated into a crystalline fraction (LF) and a liquid fraction (LL), followed by partially melting the crystalline fraction (LF) by raising the temperature, and subjecting the resulting fraction (LF) to a temperature-lowering treatment followed by subjecting to solid/liquid separation to obtain a liquid fraction (LFL) and a crystalline fraction (LFF), and
   wherein temperature-raising and temperature-lowering treatments and, if necessary, collection of the crystalline fraction are repeated.

2. The fractionation method according to claim 1, wherein the weight ratio of the crystalline fraction to the liquid fraction after fractionation or solid/liquid separation in each step is 8:2 to 2:8.

3. The fractionation method according to claim 1, wherein the weight ratio of the crystalline fraction to the liquid fraction after fractionation or solid/liquid separation in each step is 7:3 to 3:7.

4. The fractionation method according to claim 1, wherein the proportion of the liquid component remaining in the crystalline fraction obtained in each step is 15% by weight or less at a fractionation temperature.

5. The fractionation method according to claim 1, wherein the proportion of the liquid component remaining in the crystalline fraction obtained in each step is 10% by weight or less at a fractionation temperature.

6. The fractionation method according to claim 1, wherein crystalline fraction (F) contains G2U and glycerides having a higher melting point than G2U, wherein G denotes a saturated or trans-fatty acid residue, U denotes a cis-unsaturated fatty acid residue, and G2U denotes a triglyceride having two G residues and one U residue.

7. The fractionation method according to claim 1, wherein the crystalline fraction (F) is that obtained by subjecting a raw material fat containing G2U and GU2 to crystallization and solid/liquid separation to fractionate it into a crystalline fraction (F) in which G2U is concentrated and a liquid fraction (L) in which GU2 is concentrated, wherein G denotes a saturated or trans-fatty acid residue, U denotes a cis-unsaturated fatty acid residue, and G2U denotes a triglyceride having two G residues and one U residue.

8. The fractionation method according to claim 6 or 7, wherein G2U is 1,3-di-saturated-2-unsaturated triglycerides.

9. The fractionation method according to claim 8, wherein the saturated and unsaturated fatty acid residues have 16 to 22 carbon atoms.

10. The fractionation method according to claim 1, wherein the raw material fat is an isomerization hydrogenated fat having a trans acid content of 30% or more.

* * * * *